INVENTOR.
Robert Adler
BY Hugh D. Drake
Atty.

INVENTOR.
Robert Adler
BY
Hugh B. Drake
Atty.

INVENTOR.
Robert Adler
BY
Hugh S. Drake
Atty.

INVENTOR.
Robert Adler
BY Hugh H. Drake
Atty.

3,315,173
BEAM REFRIGERATION BY MEANS OF LARGE CATHODE MAGNETIC FIELDS USED IN RESISTIVE LOAD AND/OR WITH LOW NOISE AMPLIFIER

Robert Adler, Northfield, Ill., assignor to Zenith Radio Corporation, Chicago, Ill., a corporation of Delaware Filed June 13, 1966, Ser. No. 557,218
32 Claims. (Cl. 330—4.7)

This application is a consolidation of both and a continuation-in-part of each of copending applications Ser. Nos. 34,961 filed June 9, 1960, now abandoned, and 326,737 filed Nov. 29, 1963, with said application Ser. No. 34,961 in turn being a continuation-in-part of copending application Ser. No. 738,546, filed May 28, 1958, and now Patent No. 3,233,182, issued Feb. 1, 1966, all these applications being in the name of Robert Adler and assigned to the same assignee as the present application.

The present invention concerns the resistive loading which an electron beam produces in an adjacent circuit structure and is directed especially to a transverse-mode type of electron discharge device in which the resistive loading at a given signal frequency has an effective noise temperature that is low relative to the operating temperature of the device. In broad concept, the invention is addressed to the problem of cooling an electron beam where "cooling" refers to a decrease in the noise power associated with a beam immersed in a magnetic field as is characteristic of transverse-mode type electron beam devices.

Recent years have seen the noise figure of amplifiers, especially in the microwave region, reduced decibel by decibel until, today, the noise figure is no longer measured in decibels but in degrees Kelvin. The improvements in the reduction of excess noise have been brought about by devices such as the low-noise travelling-wave tube, the maser, the varactor-diode and electron-beam parametric amplifiers and the tunnel diode. Each of these now well-known devices is finding application in specific fields, the particular device utilized in a specific field depending upon the special characteristics demanded by that field.

Among the disadvantages of different ones of the devices with respect to possible utilization in different ones of the specific fields are: the need for cryogenic equipment, for microwave frequency pumps, and for circulators; exacting requirements for good input match, mechanical precision and perfection in electron gun construction, and high operating voltages. The solid-state devices are susceptible to burn out by large signals and the parametric devices have spurious outputs due to the presence of pump and idler frequencies. An overall object of the present invention is to provide a simple device which avoids these disadvantages while yet retaining the ability to amplify with low noise.

Cooling or decreasing of the noise power of the electron beam in such a device has an immediate and important application to certain signalling systems. For example, low noise transverse-mode amplifiers of both the parametric and travelling wave type have been developed with exceedingly attractive noise figures and certain of these devices can be improved still further in respect of noise through the application of the inventive concept to be described herein by means of which cooling of the electron beam is possible. Additionally, a transverse-mode electron discharge device having a coupling structure coupled to the electron beam therein may be employed as a resistive termination or sink into which power may be dissipated and, if it is used as a load in a low noise system, distinct advantages accrue from cooling of the beam because then the noise contribution of the load to the system may be minimized. That is to say, the effective noise temperature of the terminating device may be reduced well below ambient temperature.

Accordingly, it is a principal object of the invention to provide for the cooling of the electron beam in a transverse-mode type of electron discharge device.

It is another object of the invention to provide an electron discharge device of the transverse-mode type in which the resistive loading of the beam, at a given signal frequency, has an effective noise temperature that is low relative to, and may be a small fraction of, the operating temperature of the device. The reference "operating temperature" may vary with the application of the device as will be made clear from a consideration of specific signalling systems taking advantage of the beam cooling concepts.

A particular object of the invention is to provide a resistive termination or load comprising a transverse-mode type of electron discharge device in which the beam is cooled to decrease the effective noise temperature of the load and its noise contribution to the system in which it may be used.

It is another specific object of the invention to provide cooling of the electron beam in a low noise transverse-mode wave signal amplifier of the parametric amplifier, traveling wave or similar type.

The application of the invention to a transverse-mode type of electron discharge device results in the resistive loading contributed by the electron beam thereof at a given signal frequency to have an effective noise temperature that is low relative to the normal operating temperature of the device. Such a device comprises an electron gun having an electron-emitting cathode for developing and projecting an electron beam along a predetermined path which may terminate in a collector disposed across that path. There are means for developing about the path, in the region between the cathode and the collector, a field which establishes transverse electron resonance in the beam. The intensity of this field in the immediate vicinity of the cathode establishes an electron resonance frequency in the beam that is high relative to, and preferably many times higher than, the electron resonance frequency corresponding to said normal operating temperature.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 represents one form of resistive termination or load, constructed in accordance with the invention, having a cooled electron beam and characterized by a uniform magnetic field throughout the beam path of the structure;

FIGURE 1*a* is a dimensional diagram of a novel form of coupling structure included in the arrangement of FIGURE 1;

Figure 8:
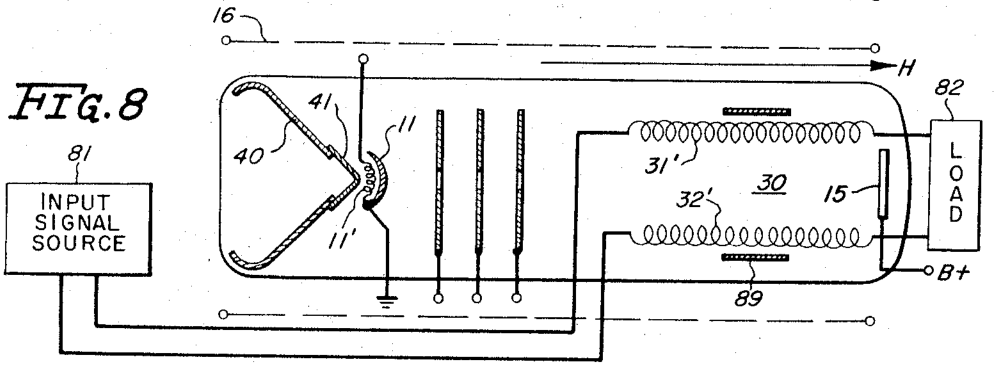
Figure 7:
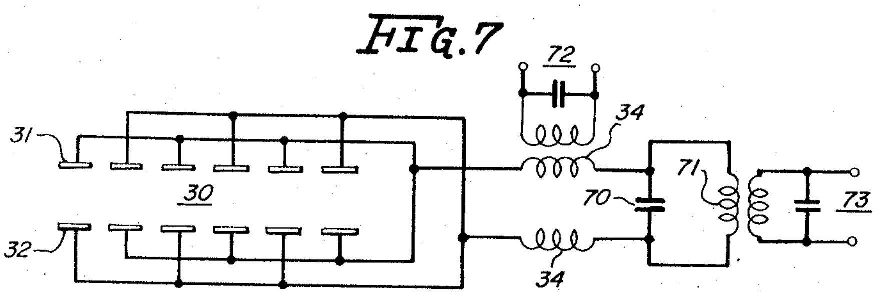
Figures 9, 14:
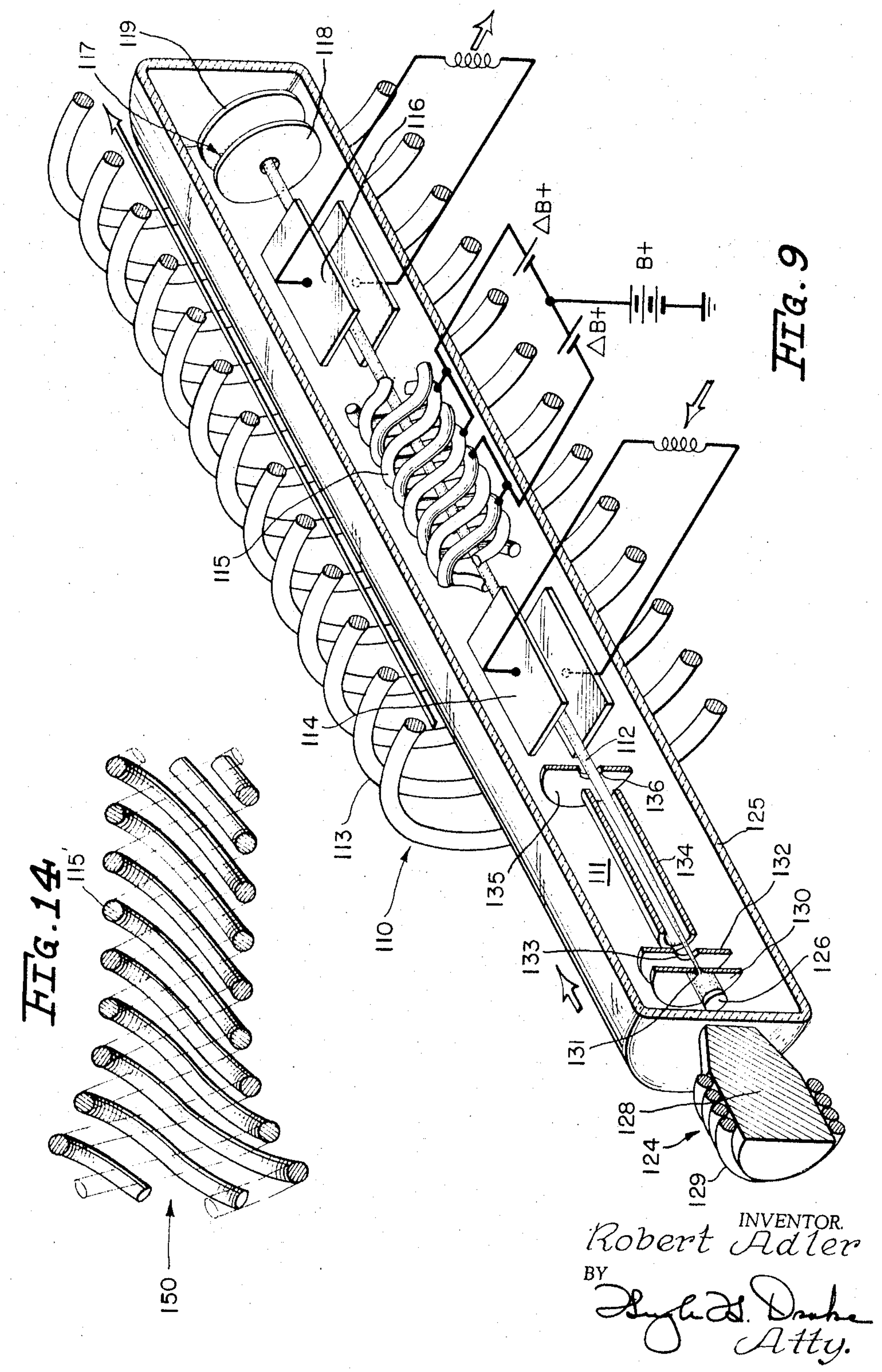
Figures 10, 13:
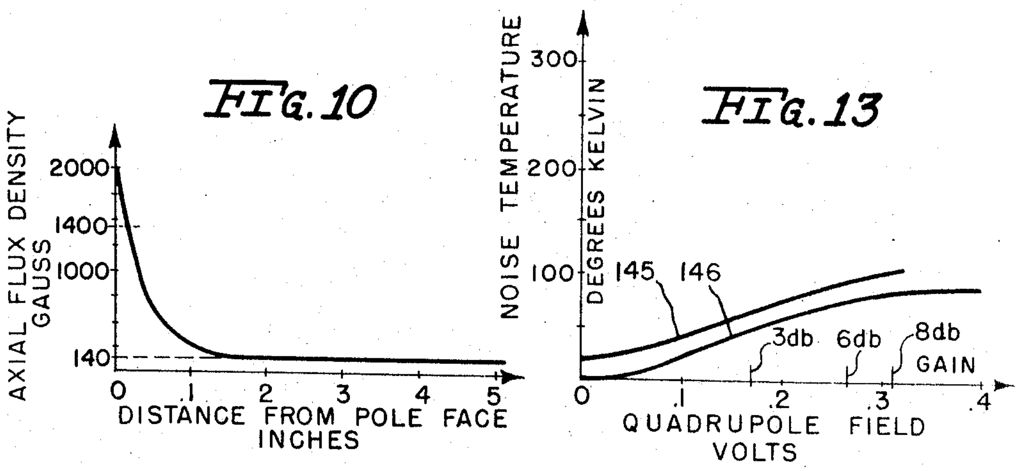
Figures 11, 12:
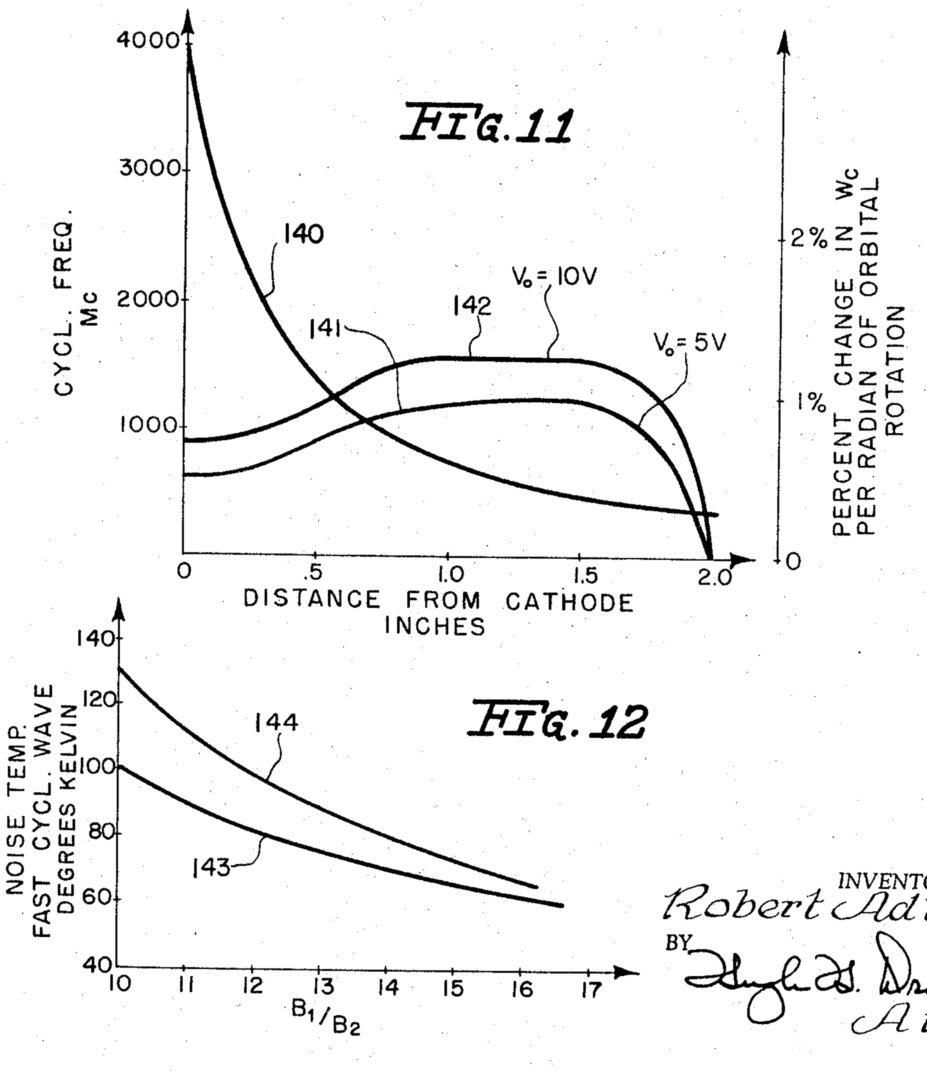

FIGURE 7 pertains to a novel form of coupling structure;

FIGURE 8 represents a transverse-mode travelling wave tube having beam cooling in accordance with the invention;

FIGURE 9 is a semi-diagrammatic, perspective view, partially broken away, of an electron beam device constructed in accordance with the present invention;

FIGURE 10 is a graph illustrating flux density variation in a portion of the device of FIGURE 9;

FIGURE 11 is a graph illustrating further operational characteristics of the device shown in FIGURE 9;

FIGURES 12 and 13 are graphs depicting still further operational characteristics of a device like that in FIGURE 9; and FIGURE 14 is a fragmentary perspective view of an alternative form of a portion of the FIGURE 9 device.

Before describing the structural details of a transverse-mode electron discharge device having a beam cooled in accordance with the present invention, it is appropriate to consider the noise power carried by a cyclotron wave in relation to the signal and cyclotron frequencies as well as the cathode temperature. The noise power $P_{noise}$ propagating in the fast or slow cyclotron modes at a frequency $\omega$ and with an electron beam travelling in a uniform magnetic field is given by the following expression:

$$|P_{noise}|=\frac{\omega}{\omega_c}kT_c\Delta f \qquad (1)$$

where $\omega_c$ is the cyclotron frequency, $k$ is Boltzmann's constant, $T_c$ is the cathode temperature, and $\Delta f$ is the bandwidth in cycles per second. The effective beam noise temperature is expressed by the term $$\left(\frac{\omega}{\omega_c}T_c\right)$$

from which it can be seen as the cyclotron frequency increases the effective beam noise temperature decreases.

However, an increase of the cyclotron frequency in the signal coupling and amplifying regions of such electron beam devices can in many cases lead to other disadvantageous results. For example, in the conventional slow-wave amplifier, an increase in cyclotron frequency decreases the gain of the device. As will be shown, however, the increased cyclotron frequency need exist only in the vicinity of the cathode and may be reduced in a direction downstream from the cathode to a value more suitable for coupling to the fast or slow cyclotron wave.

Generally speaking, the noise power carried by a cyclotron wave is not conserved in a spatially varying magnetic field. Accordingly, it is instructive to examine the conditions under which the available noise power at any given signal frequency remains the same as that at the cathode. The power P propagating on a fast or slow cyclotron wave at a frequency $\omega$ is given by the expression:

$$P=\frac{\omega}{\omega_c}\frac{I_o}{2\eta}V_T^2 \qquad (2)$$

where $I_o$ is the beam current, $V_T$ is the tangential velocity associated with the electron motion, and $\eta$ is the ratio of electron charge to electron mass. Since the tangential velocity of an orbiting particle is the product of the radius and angular frequency of motion, Equation 2 can be rewritten as follows:

$$P=\frac{I_o}{2\eta}\omega\omega_c r^2 \qquad (3)$$

where $r$ is the radius of orbital motion.

Assuming, then, that the noise power is propagating in a region over which the magnetic field varies, $\omega_c$ necessarily will vary proportionally. Consequently, the noise power can remain constant only if the radius varies in a manner satisfying the following expression:

$$\omega_c r^2=\text{constant} \qquad (4)$$

Multiplying this by $\frac{1}{2}m$ and, for convenience, $\omega_c/\omega_c$ we obtain:

$$\frac{\frac{1}{2}m\omega_c^2r^2}{\omega_c}=\text{constant} \qquad (5)$$

where $m$ is the electron mass. Equation 5 defines the ratio of rotational kinetic energy to the frequency of rotation.

For cyclotron waves of random noise, caused by the thermal transverse velocities of electrons leaving the cathode, it can be shown that $V_T$ in Equation 2 is independent of frequency. Therefore, the noise power carried by a fast or slow cyclotron wave corresponding to a given signal frequency is proportional to the ratio of that signal frequency $\omega$ to the cyclotron frequency $\omega_c$.

It is apparent from Equation 2 that cooling of the beam or reduction of its noise power, in respect of the fast or slow cyclotron waves, may be accomplished by employing a high ratio between the cyclotron and signal frequencies and, of course, the cyclotron frequency is adjustable by changing the intensity of the cyclotron or magnetic field in which the beam is immersed. In other words, the desired high ratio of cyclotron to signal frequencies, that is, a higher cyclotron frequency than normal in the device for the selected signal frequency, may be easily obtained by the use of a high intensity magnetic field.

As indicated, it is not essential that the high cyclotron frequency be maintained throughout the entire path of the beam. Coupling considerations, for example, may make it desirable to reduce this ratio, even to unity, and so long as the change is gradual enough that the principle of adiabatic invariance remains valid, the noise power is the same anywhere along the beam even though the cyclotron field may vary; as will be explained in more detail below, such change should be non-uniform. In principle, cooling may be extended indefinitely by increasing the intensity of the cyclotron field in the immediate vicinity of the cathode and the beam can serve as a refrigerated load approaching zero degrees absolute temperature.

From Equation 5, then, it can be seen that if the ratio of rotational kinetic energy to the cyclotron frequency remains constant during a change in the strength of the magnetic field, the noise power of the beam will remain constant. If this condition is met throughout the beam path, the noise power at the signal frequency $\omega$ will remain the same as it was at the cathode. It is this ratio of the energy in a system to its frequency of oscillation which is called the adiabatic invariant. It has long been known that this ratio, which represents the number of quanta stored, remains constant if the frequency-determining parameters of a system are varied only gradually. While in some cases, the magnetic field may be reduced along the beam path very gradually over a comparatively long distance, in certain applications this is undesirable because it results in long tube lengths and entails somewhat reduced flexibility in design and manufacture.

Figure 1:
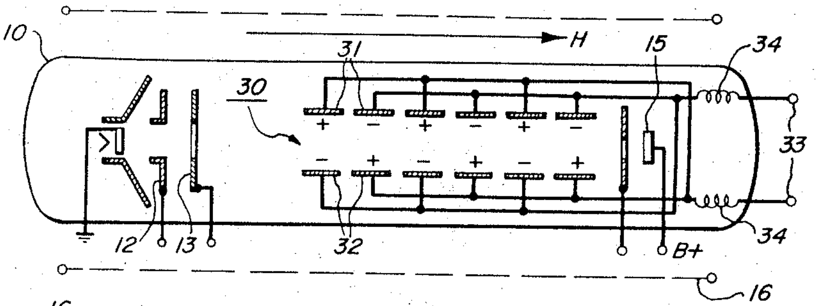

Referring now more particularly to FIGURE 1, the device there represented is a transverse-mode type of electron discharge device including an electron gun structure positioned at one end of an enclosing envelope 10. The gun may be of any conventional design and, for convenience, is represented as the well-known modified form of Pierce gun having a cathode 11 and an apertured anode 12 which is maintained at a positive potential with respect to the cathode. The anode may be followed by an electrode system, indicated simply by an electrode 13, for focusing or shaping into a beam those electrons which pass through the aperture of the anode. This beam is directed along a path from cathode 11 to a collector electrode 15 disposed transversely of the path. The beam path usually corresponds to the axis of envelope 10.

The electron beam in the transverse-mode type of device is projected through a homogeneous magnetic focusing field, represented symbolically by the arrow H, which parallels and surrounds the beam path. As a practical matter, the means for developing the focusing field comprises a solenoid 16 arranged coaxially of envelope 10 and coupled to a direct current source (not shown) of adjustable magnitude to facilitate controlling the field intensity. In the embodiment of FIGURE 1, the field is uniform along the path from cathode 11 to collector 15 and is adjusted to have such intensity that the electron resonance frequency of the beam is high relative to, preferably several times higher than, the intended operating or signal frequency.

Circuit means are disposed transversely of the beam path between the electron gun and collector 15 in order to couple to the beam and also to couple the device as a resistance termination into a signalling system. This coupling means is designated 30 and is an iterative or interdigital type of coupler. It comprises a first series of fingers or conductive strips 31 positioned to one side of the beam path and extending transversely thereof and a like second series of strips 32 positioned symmetrically on the opposite side of the beam path. Alternate strips of the series 31 are connected together and alternate members of the series 32 are likewise connected together. Moreover, the two series are interconnected so that a voltage source applied to the structure results in facing members as well as contiguous members of the two series 31 and 32 being at opposite instantaneous polarities as illustrated. The two series 31 and 32 are connected to a pair of terminals 33, 33 through tuning inductors 34, 34. These inductors are designed to tune the coupler to exhibit sharp resonance at a desired signal or operating frequency.

As indicated above, transverse-mode type of electron discharge devices, in response to deflection modulation of the beam, develop both a fast wave and a slow wave on the electron beam and their respective phase velocities may be expressed as follows:

$$V_f=\frac{u_o}{1-\frac{\omega_c}{\omega}} \tag{6}$$

$$V_s=\frac{u_o}{1+\frac{\omega_c}{\omega}} \tag{7}$$

where $u_o$=the electron velocity in the axial direction
$\omega_c$=the radian cyclotron frequency
$\omega$=the radian frequency of the signal modulation.

Where the cyclotron and signal frequencies are equal or close to one another in value, the fast and slow wave signals are sufficiently differentiated from one another in velocity that a coupler may be easily constructed to respond selectively to one or the other. Specifically, for the case where the signal and cyclotron frequencies are the same, the phase velocity of the fast wave is infinite and a lumped coupler, in the form of two deflector plates disposed symmetrically on opposite sides of the beam path, provides effective coupling essentially only to the fast wave signal. However, if the cyclotron frequency is several times the signal frequency, as is the case with the structure of FIGURE 1, the absolute magnitudes of the phase velocities of the fast and slow waves approach one another and it is much more difficult to separate them in a coupling structure on the basis of phase velocity. Nevertheless, this desirable result is attainable with the interdigital coupler of FIGURE 1 which may be dimensioned to achieve efficient coupling to the fast wave and substantially zero effective coupling to the slow wave. Additionally, dimensioning of the coupler permits determination of the beam loading resistance in accordance with the following expression:

$$R_{B(\omega)}=\left[8\frac{V_o}{I_o}\left(\frac{2a}{l}\right)^2\right]\left(\frac{\pi}{2}\right)^2\left[\frac{\pi\delta/L}{\sin\frac{\pi\delta}{L}}\right]^2\left[\frac{\sin h\frac{\pi a}{L}}{\frac{\pi a}{L}}\right]^2\left(\frac{\omega_c}{\omega}\right) \tag{8}$$

where, $V_o$=longitudinal accelerating voltage determining beam velocity,
$a$=spacing of each series 31, 32 from the beam axis.
$l$=overall dimension of the coupler along the beam axis.
$\delta$=half the spacing between contiguous members of the series.
L=distance between corresponding points of any two contiguous members of either series.
$R_{B(\omega)}$=loading at the signal frequency $\omega$.

Figure 1A:
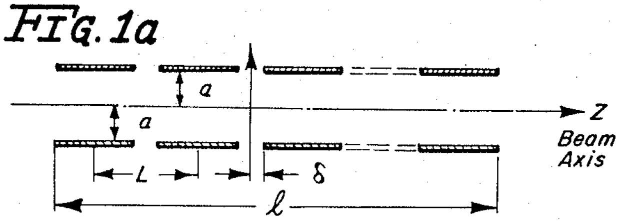

FIGURE 1A shows the application of these dimensions to the coupling structure.

The resistive and reactive components of impedance observed at terminals 33, 33 may be adjusted by varying beam current and beam velocity respectively and usually it is arranged that the device represents a predominantly resistive impedance of a predetermined nominal value. The terminating device may be coupled directly as a load in the signalling system or, if its terminal impedance is not suited for direct connection, an impedance matching network of any well-known construction may be interposed between terminals 33, 33 and the system component to which the device is to be coupled.

To have coupler 30 selective to the fast, as distinguished from the slow wave, it is dimensioned to achieve an integral number of full cycles phase difference of the slow wave relative to the fast wave over the entire length 1 of the coupler. It will be apparent from Equations 2 and 3 that the absolute magnitude of the fast wave velocity is larger than that of the slow wave velocity. For optimum coupling in respect of the fast wave the following expression is to be satisfied:

$$\frac{\omega}{V_f}=\frac{\omega-\omega_c}{u_o}=\beta_f=-\pi/L \tag{9}$$

At the same time for slow wave cancellation of minimum coupling in respect of the slow wave the following condition is to be satisfied:

$$|\beta_s|-|\beta_f|=2\pi N/l \tag{10}$$

where N is an integer and $\beta_s$ and $\beta_f$ are the phase constants of the slow and fast waves respectively.

One embodiment of the device of FIGURE 1 constructed and successfully operated as a cooled terminating resistor had the following specification:

| | |
|---|---|
| $a$=.010″ | $V_o$=17 volts |
| $\delta$=.016″ | $I_o$=52 $ua$ |
| $L$=0.064″ | $\omega_c/\omega$=9 |
| $l$=1.024″ | |

The coupler has sixteen facing pairs of fingers which corresponded to eight fast wave lengths or, at the same time, to ten slow wave lengths through which slow wave cancellation was achieved. The coupler was sharply tuned to 90 megacycles; the cyclotron frequency was approximately 800 megacycles and the operating temperature of the cathode, without the cooling effect, was in the usual range of 1000° to 1200° K. The theoretical noise temperature of the beam at 90 megacycles should be approximately 120° K., representing a reduction of one-ninth which is the ratio of signal to cyclotron frequency. Losses in the system represented one-sixth of the total loading, and taking them into consideration leads to a theoretical effective beam temperature of 160° K.

The observed value of effective beam temperature was 186° K., which reflects not only a material reduction in effective noise temperature of the beam but also close conformity with the theory of beam cooling developed above. The above-described inter-digital coupler of FIGURES 1 and 1*a* and also the coupler system of FIGURE 7 are described and claimed, as such, in copending application Ser. No. 563,622, filed June 13, 1966, and in turn a division of copending application Ser. No. 34,961, filed June 9, 1960, both in the name of Robert Adler and assigned to the same assignee as the present application.

Figure 2:
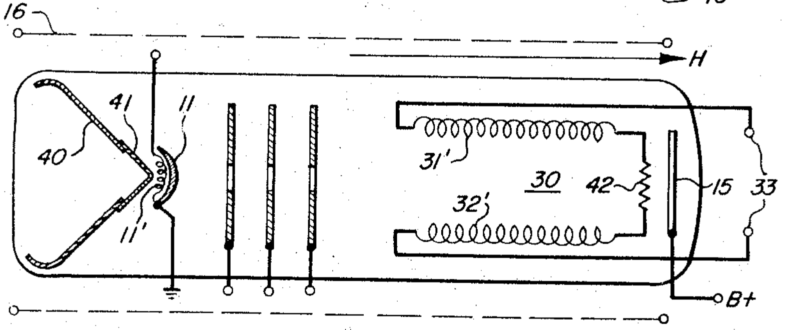
FIGURE 2 is a modified form of resistive terminating device having a non-uniformly changing magnetic field and exhibiting electron resonance which, in all portions of the beam, is higher than the desired signal frequency.
Figure 3:
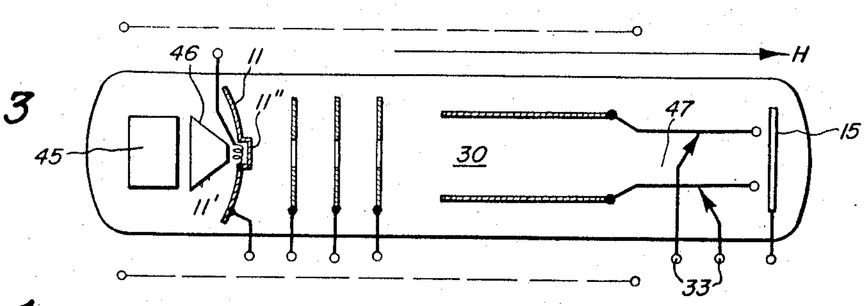
FIGURE 3 represents a further modification also having a non-uniformly changing cyclotron field but characterized by the fact that the field intensity in the vicinity of the coupling structure establishes an electron resonance that is approximately equal to the desired signal frequency.

Other forms of cooled transverse-mode electron-discharge devices suitable for use as a resistive termination but featuring a non-uniform cyclotron field change are represented in FIGURES 2 and 3. In FIGURE 2 the cathode 11 is convex in cross section and its heater is represented at 11'. The unnumbered apertured electrodes in front of the cathode accomplish the usual beam forming function. The solenoid 16 again develops a cyclotron field but, in this embodiment, the field is non-uniform; it has maximum intensity in the immediate vicinity of the cathode and decreases in intensity gradually in the direction of collector 15 to a minimum and, preferably a uniform, value which establishes, throughout the region of the tube in which the coupler is located, an electron resonance frequency higher than the signal frequency although substantially lower than the resonance frequency prevailing in the immediate vicinity of the cathode. This desired field distribution is attained by the use of a magnetic field concentrator positioned to the side of cathode 11 opposite that of collector 15. The intensifier 40 is a cone of magnetic material provided with a pole piece or terminating portion 41 of a ferro-magnetic material having a high Curie point, such as cobalt. With this construction, the field is greatly intensified in the region encompassing the cathode and immerses the emitting surface of the cathode in an intense cyclotron field.

Since the cyclotron field has uniform intensity in the region occupied by coupler 30 but is non-uniform in the region of the cathode, the arrow H has been displaced to the right in FIGURE 2. Also, this figure shows a different form of coupling structure 30 comprising a balanced helical transmission line, including two helices 31' and 32'. The transmission lines are positioned on opposite sides and in parallel relation to the beam path and are designed to have a propagation velocity substantially equal to the phase velocity of the fast wave. The end of the line closer to collector 15 is terminated in its characteristic impedance 42 and the opposite end of the coupler connects to terminals 33. The coupling of such a structure to the electron beam of the transverse-mode electron device and the matter of energy interchange therebetween is described in detail in copending application Ser. No. 804,249, filed Apr. 6, 1959, and now abandoned in the name of Robert Adler and assigned to the assignee of the present invention.

In the modification of FIGURE 3, solenoid 16 tends to establish a uniform cyclotron field throughout the path of travel of the electron beam and its magnitude is adjusted to achieve electron resonance at a frequency equal to the signal frequency. Cooling, through the expedient of a cyclotron field in the immediate vicinity of the cathode sufficiently strong to result in electron resonance several times the signal frequency, is introduced by an additional magnet structure adding an additional field component in the vicinity of the cathode. Specifically, a permanent magnet 45 is positioned behind the cathode structure on the side opposite collector electrode 15. Concentration of the field from the permanent magnet is accomplished by the concentrator 46 which intensifies the field of the magnet in the vicinity of the cathode structure. Here the cathode is generally dish-shaped with a projecting portion 11'' coated with an electron emitting substance and heating by the filament 11'. The intensity of the cyclotron field decreases along the length of the tube to a uniform value in the region occupied by coupler 30 such that the electron resonance frequency thereat is approximately equal to the signal frequency. The coupler may now be of a lumped structure, rather than the distributed parameter type shown in the embodiment of FIGURE 2. In the modification of FIGURE 3 the coupler comprises a pair of deflectors positioned on opposite sides of the beam path and connected to output terminals 33, 33 through an impedance-transforming transmission line section 47.

Figure 4:
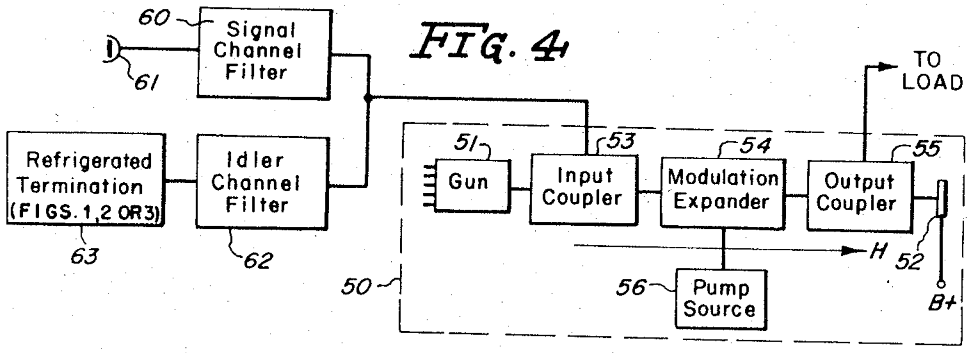
FIGURES 4 and 5 represent applications of the refrigerated terminating devices to low noise signalling systems.
Figure 5:
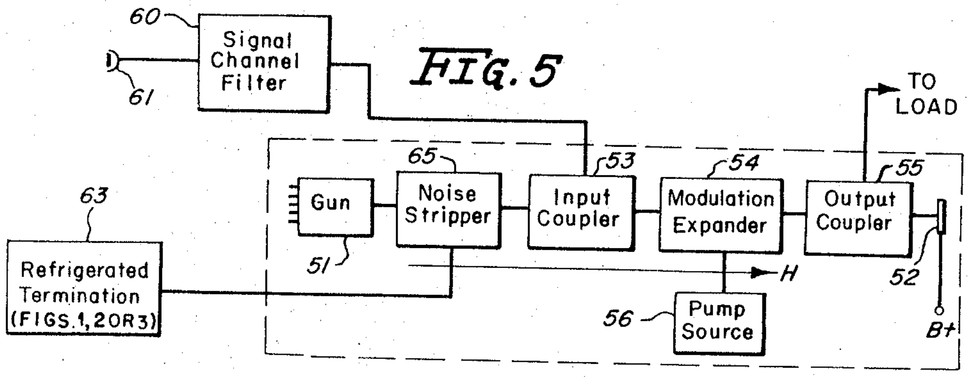

FIGURES 4 and 5 disclose signalling systems to which terminating devices of the type represented in FIGURES 1 to 3, inclusive, have particular application. FIGURE 4 shows in block diagram a parametric amplifier with an improved noise figure resulting from the application to the system of a refrigerated termination constructed in accordance with the invention. The amplifier itself, which will be considered initially as of the degenerate form, is enclosed within the broken-line rectangle 50 and is depicted as comprising an electron gun structure 51 for developing and projecting an electron beam along a predetermined beam path to a collector 52 which terminates that path. The cyclotron field, represented symmetrically by the arrow H, is provided in the usual way so that the beam, being immersed in a homogeneous magnetic field, experiences electron resonance at a frequency equal to the frequency of the signal to be amplified. This frequency relation is characteristic of the degenerative form of parametric amplifier. Interposed between gun 51 and collector 52 in the order recited are an input coupler 53, a modulation expander 54 and an output coupler 55. The input and output couplers have the same construction and may be of the form represented by structure 30 in FIGURE 3, comprising a pair of deflectors positioned on opposite sides of the beam path and an impedance-transforming transmission line section through which a signal source may be connected to the input coupler and through which a load circuit may be connected to the output coupler, respectively.

The modulation expander may be the now familar quadrupole-type structure which develops a time variable non-homogeneous pumping field to accomplish modulation expansion and amplification of the fast electron wave carried by the beam after it has been modulated by an input signal with the help of input coupler 53. This pumping field derives its energy from a pump signal source 56 coupled to the quadrupole.

The structure as thus far described is disclosed and claimed in copending application Ser. No. 747,764, filed July 10, 1958, by Glen Wade and now abandoned in favor of continuation application Ser. No. 289,792, filed June 20, 1963, both assigned to the same assignee as the present invention.

One characteristic of the quadrupole modulation expander, and in fact of all modulation expanders for this type of tube, is the production of an idler signal which is related to the pump and desired signal frequencies in accordance with the following:

$$\omega_p = \omega_s + \omega_i \qquad (11)$$

where the subscripts *p*, *s* and *i* represent the pump, desired signal and idler signal frequencies, respectively. Because of this relation, noise or other signal components at the idler frequency carried by the beam into the field of the quadrupole introduce noise into the signal channel and deteriorate its noise figure from its attractive theoretical potential. This may be improved, as indicated in the system of FIGURE 4, by interposing a bandpass filter 60 in the lead which couples an antenna 61 to input coupler 53. The bandpass filter is designed to select and pass only the desired signal frequency to the input coupler and reject signal components at the idler frequency. It is also necessary, however, to provide a termination for the idler noise originating in the electron gun and removed from the beam through the energy exchange accomplished by input coupler 53. The coupler strips fast wave noise components from the beam while at the same time modulating the beam with a desired input signal received from antenna 61. The idler components of the noise thus removed from the beam must be dissipated in a resistive termination and this is accomplished by a filter 62 which is selective to the idler frequency signal components and passes them to a refrigerated termination 63. The terminating device may have the construction shown in any of FIGURES 1 to 3.

The improvement realized in noise performance in the arrangement of FIGURE 4 is that resulting from reducing the apparent noise temperature of the resistive termination 63 coupled to input coupler 53 as an energy sink for fastwave idler noise components. If a conventional resistive termination, having no refrigeration, is employed it is equivalent to a noise source at ambient temperature but refrigerating the termination causes it to appear to have a much lower temperature and to contribute correspondingly less noise to the system. If for example the termination is at room temperature which is approximately 290° K., the degradation in noise on the system because of the effect of the noisy termination is in the neighborhood of 3 decibels. Providing a termination of the type described hereinabove, featuring cooling of the electron beam to establish an apparent noise temperature in the neighborhood of 180° K. or even less, effects a corresponding reduction in noise and improvement in signal-to-noise ratio.

The same sort of improvement may be realized by pre-cooling the beam of the parametric amplifier as accomplished in the arrangement represented in FIGURE 5. In this modification an added coupler or noise stripper 65 is interposed between electron gun 51 and input coupler 53 of the amplifier. It may be the same sort of structure as the input coupler but merely serves the purpose of removing noise from the electron beam as the beam travels toward the input coupler. Noise stripper 65 is terminated by the refrigerated termination 63. The system works essentially the same as the system of FIGURE 4 differing only in that noise components at the idler frequency carried by the beam are dealt with ahead of the input coupler.

The arrangement of FIGURE 5 may also represent the case wherein the amplifier is of the non-degenerate type and in which the idler frequency is higher than the signal frequency and also exceeds the cyclotron frequency. For the assumed conditions and in the absence of noise stripper 65, the effective noise temperature of the beam at the idler frequency is greater than the operating or cathode temperature as will be understood by inserting in Equation 2 the selected values of idler and cyclotron frequency. If noise stripper 65 is now employed and a resistor at room temperature is used in place of resistance termination 63, matters are improved because the effective noise temperature of the beam at the idler frequency is now reduced to ambient temperature.

It may be shown that the conversion of the fast wave idler frequency components in the quadrupole to the signal frequency introduces a power change in the ratio of signal frequency to idler frequency. Since it has been assumed that the idler frequency is greater than the signal frequency, this introduces a further reduction in noise power.

A still further improvement results from terminating noise stripper 65 in the refrigerated type of termination represented, for example, by the structures of FIGURES 1 to 3. The presence of the refrigerated termination may modify the apparent temperature of the electron beam in respect of fast wave noise components at the idler frequency from ambient or 290° K. to a much lower value, for instance, 80° K. Since the same proportional reduction in noise power results in the conversion process within the quadrupole, the final effective or apparent noise temperature of the system at the idler frequency may be brought close to absolute zero. In concluding this discussion of FIGURE 5, for the case wherein the signal and idler frequencies are quite different from one another, it is to be pointed out that such a system may use coupling structures of the distributed parameter type as described in Adler application Ser. No. 804,249, filed Apr. 6, 1959. This is particularly so if the relative values of signal, cyclotron and pump frequencies result in forward and backward moving fast waves on the electron beam.

Figure 6:
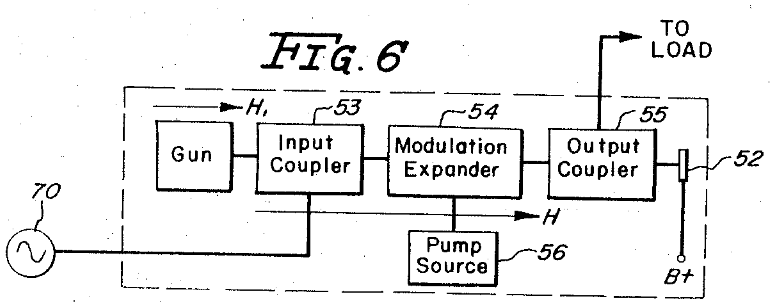
FIGURE 6 is a block representation of a transverse-mode parametric amplifier employing cooling of the electron beam.

FIGURE 6 is another representation of a parametric amplifier in which a signal source 70 is represented as connected to input coupler 53. After amplification, the signal is delivered to a load through output coupler 55. To obtain best results with this amplifier it is necessary to achieve impedance match of the input coupler to the input signal source. A mismatch at the input gives rise to signal reflections and deterioration of the noise figure but the adverse effects of such a mismatch may be reduced by cooling the beam of the amplifier. Accordingly, arrow H1 indicates that the cyclotron frequency in the immediate vicinity of the electron gun, particularly at its cathode, is greatly intensified to reduce the apparent noise temperature of the beam at the operating signal frequency. This may be accomplished by the use of field concentrators or additional magnet arrangements located just beyond the cathode all as discussed in conjunction with FIGURES 2 and 3, respectively.

The input coupler in the arrangements of FIGURES 4 and 6 serves the dual function of modulating a received input signal on the beam and concurrently deriving from the beam fast wave noise components at the idler frequency carried by the beam into the field of the coupler. Where the significant frequencies of the amplifier establish the forward/backward fast wave conditions described in Adler application Ser. No. 804,249, the interdigital or iterative type of coupling structure illustrated in FIGURE 1 has uniquely attractive characteristics. In this condition the signal frequency is less than the cyclotron frequency while the idler frequency is greater that the cyclotron frequency and one may assume the special case in which the signal and idler frequencies are symmetrical with respect to the cyclotron frequency. Since the pump frequency is equal to the sum of the signal and idler frequencies, the special case may be realized by using a pumping frequency which is twice the cyclotron frequency. The phase constant at the pump frequency is always equal to the sum of the phase constants as the signal and idler frequencies. Therefore, if the pump structure or modulation expander is a lumped quadrupole, the pumping phase constant is zero and the phase constants at the signal and idler frequencies becomes equal in absolute value. This means that an iterative coupler with appropriate spatial periodicity will provide effective coupling to both the signal and idler waves; the periodicity of the fingers is given by Equation 9, above. Specifically, the dimension 2L is equal to the wavelength of the signal wave and the wavelength of the idler, or:

$$\lambda_s=\lambda_i=2L \qquad (12)$$

Such waves may then be separated by including the coupler in a multi-resonant structure having one resonance at the signal frequency and another at the idler frequency. A suitable such arrangement is indicated schematically in FIGURE 7.

The coupler is again shown as including a first series of spaced strips or fingers 31 and a second similar series of spaced members 32 positioned on opposite sides of the beam path in symmetrical and facing relation. A pair of inductors 34, 34 are connected across the coupler by means of a capacitor 70 which, in turn, is connected in parallel with another tuning inductor 71. This network, including tuning inductors 34 and 71 as well as capacitor 70 and the capacitance represented by coupler 30, has two modes of resonance: (1) a high-frequency mode including coupler 30 in series with inductors 34, 34 and capacitor 70; and (2) a low frequency mode in which the coupler and capacitor 70 are in parallel with tuning inductor 71. The high-frequency mode is resonant at the idler frequency and the low-frequency mode is resonant at the signal frequency. Accordingly, a first frequency selective network 72, including a coil inductively coupled to inductor 34, selects the idler signal for application to a load and a second frequency selective network 73, coupled to inductor 71, selects the signal frequency for connection to a signal source.

A coupler and multiple resonant structure of the type represented in FIGURE 7 may be employed in the system of FIGURES 4 or 6, replacing input coupler 53. When so utilized, selector 73 becomes the signal channel filter 60 and selector 72 is connected to refrigerated termination 63. Functionally, the coupler effects deflection modulation of the electron beam in response to the input signal applied through selector 73 and concurrently strips fast noise components at the idler frequency from the beam and dissipates that energy in refrigerated termination 63. This, then, has the further advantage of the reduced effective noise temperature realized through the presence of the refrigerated termination 63. The output coupler may likewise be of the iterative type but it is only necessary to tune to the desired signal component which, for the assumed case, is the signal frequency selected by input selector 73. It has been stated that the backward/forward arrangement under consideration presupposes the use of a lumped quadrupole as modulation expander 54. Such a quadrupole is described and claimed in a copending application of Glen Wade, Ser. 747,764, filed July 10, 1958, and assigned to the same assignee as the present invention.

It has been indicated that beam cooling is effective in reducing noise power for both the fast and slow cyclotron waves in a transverse-mode type of device. This may be put to advantage in the construction of travelling wave or backward wave amplifiers which are slow wave mechanisms and the application of the invenvention to a transverse-mode travelling wave tube is represented in FIGURE 8. Structurally, the tube is similar to that of FIGURE 2 and corresponding components are identified by similar reference characters. For the travelling wave tube, however, the slow wave circuit comprising helices 31′ and 32′ is coupled to and interacts with the beam throughout most of the beam path and, in order to obtain amplification, it is necessary that the phase velocity of the signal wave on the helices be synchronous with the phase velocity of the slow cyclotron wave on the electron beam. The phase velocity of the slow wave structure may be adjusted by appropriately selecting the parameters of helices 31′, 32′ and the phase velocity of the slow cyclotron wave on the beam may be adjusted by controlling the intensity of the magnetic field provided by solenoid 16. The end of the structure closer to the cathode couples to the input signal source 81, with an intervening impedance matching network (not shown) if that be necessary to achieve impedance matching at the input. The terminals of the slow wave structure adjacent collector 15 on the other hand couple to the utilizing or load circuit 82. Midway of helices 31′ and 32′ is the usual attenuator 89 used to suppress signal waves which may travel in a backward direction on the slow wave circuit.

A reduction in the noise power of the beam results from the fact that the cyclotron frequency in the immediate region of the cathode is very high relative to the signal frequency, as described in conjunction with FIGURE 2. The cooled beam in travelling the beam path to the collector 15 is coupled to slow wave structure 31′, 32′ and is deflection-modulated by the input signal applied to that structure. Since the signal wave on the slow wave structure and the slow cyclotron wave on the beam are synchronous, there is continuous interaction therebetween as the beam travels the field of the slow wave structure which achieves travelling wave type amplification in the usual manner. The amplified signal is applied to the load circuit for utilization.

Utilizing a salient pole or concentrator behind the cathode, the magnetic field in the devices of FIGURES 2, 3 and 8 decreases non-uniformly along the beam path away from the cathode. Such non-uniformity is desirable and is optimized in the embodiment of FIGURE 9, wherein, for exemplification, electron beam device 110 is a D.C.-pumped parametric amplifier. It includes an electron gun 111 for projecting a stream or beam of electrons along a path or axis 112. Encircling path 112 over a given portion of its length beyond electron gun 111 is a solenoid 113 which develops a homogeneous magnetic field through which the electron beam is projected parallel to the flux lines. Solenoid 113 establishes a condition of cyclotron resonance for the electrons.

An input-signal Cuccia coupler 114 is disposed first along the beam path following the electron gun. The application of input signal energy across the electrodes of coupler 114 causes the electrons to follow helical orbits around axis 112 with a periodicity determined by the strength of the homogeneous field from solenoid 113 and with a radius proportional to the input signal amplitude.

Downstream from coupler 114 is a twisted-quadrupole D.C.-pumped type of electron motion expander 115. It is composed of a quadrifilar helix wound around axis 112 with a pitch substantially equal to that of the electron orbits. Expander 115 subjects the electrons to a periodic inhomogeneous field. In this instance, the field itself is static as seen by an external observer, but as viewed by the moving electron its polarity reverses four times for every cyclotron orbit. That is, it defines a spatial periodicity equal to twice the cyclotron resonance period.

Downstream from pump section 115 is an output Cuccia coupler 116 which in use is coupled to a load. Coupler 116 operates inversely to input coupler 114 and extracts the amplified signal energy from the electron beam.

Spaced beyond output coupler 116 is a collector 117. The latter preferably is constructed with a first apertured electrode 118 which depresses the D.C. field gradient and which is followed along the beam path by an anode electrode 119 which actually receives the spent electrons.

The general operation of device 110 is now well known. Its manner of performance was analyzed and described in an article entitled, "The D.C. Pumped Quadrupole Amplifier—a Wave Signal Analysis," by A. E. Siegman, which appeared at pages 1750–1755 of the October 1960 issue of the "Proceedings of the I.R.E." The principles involved were outlined in an article entitled, "The Quadrupole Amplifier, a Low-Noise Parametric Device" by R. Adler et al., which appeared at pages 1713–1723 of the October 1959 issue of the "Proceedings of the I.R.E." Quite briefly, the orbiting electrons which leave input coupler 114 are subjected in twisted quadrupole 115 to field forces having the proper direction so as to cause additional energy to be imparted to the moving electrons. In the particular case of the D.C. pump, the D.C. energy which effects translation of the electrons along beam path 112 is converted by the inhomogeneous quadrupole field to rotational kinetic energy of the electrons.

As explained earlier and also in the aforesaid Adler et al. article, energy may appear in the electron beam in either the fast or slow cyclotron wave. The electron waves are a function of the pattern of all of the electrons together. The instantaneous amplitude of the beam "envelope" is what is seen by the couplers. The beam noise power of principal concern in this instance is that which is, in either or both the slow and fast waves, the result of thermal velocity imparted to the electrons at the cathode. It is conventional to define the noise power in terms of beam temperature, and at the cathode in device 110, the temperature may be about 1000° K. As in the earlier embodiments, a field is developed in the vicinity of the cathode which has a strength substantially higher than that developed within solenoid 113. To this end, an electromagnet 124 is disposed outside the envelope 125 which encloses the evacuated space through which beam path 112 extends. Electromagnet 124 is located close to the end of envelope 125 and immediately opposite the cathode 126 in electron gun 111.

Electromagnet 124 develops a highly concentrated field in the vicinity of cathode 126. As part of the invention, it has been discovered that the effective rate of change of the magnetic field strength from the cathode vicinity to the end of the electron gun immediately upstream from coupler 114 should be no greater than about 1.5 percent per radian of electron orbital motion. This, then, corresponds to a change of about 10% per orbit. To this end, electromagnet 124 is shaped and electron gun 111 is constructed to effect the field strength reduction in the downstream direction.

Electromagnet 124 has a soft iron pole piece or core 128 of generally cylindrical shape but tapered conically toward axis 112 over its end portion adjacent the envelope at a angle selected so that the flux lines in the vicinity of the cathode developed by the electromagnet have a shape defining the required rate of change in field strength. The flux from electromagnet 124 is developed by a winding 129 wrapped about the circumference of core 128 and energized with direct current.

Electron gun 111 includes an anode electrode 130 immediately downstream from cathode 126 and having an aperture 131 centered on beam path 112. Immediately downstream from electrode 130 is a focus electrode 132 having an aperture 133 centered on path 112. Next along path 112 is a cylinder 134 coaxial with the path and defining a drift region. At the downstream end of the drift region is another focus electrode 135 having an aperture 136 centered on beam path 112.

In a successful tube constructed as shown in FIGURE 9, the beam voltage in the input Cuccia coupler is about 6 volts, the beam current is 15 microamperes, and the diameter of the beam projected from electron gun 111 is 0.015 inch; the Brillioun limit for such a beam is 22 microamperes. In travelling through drift cylinder 134, the beam expands approximately ten times in area as it diverges under the influence of the added field from electromagnet 124. In electron gun 111, the cathode-anode region is a space-charge-limited diode which operates with a cathode current density of about 120 milliampers per square centimeter, the operation in the diode being at about 25 volts and 2 milliamperes. Aperture 131 in anode 130 is of substantially smaller cross-sectional area than the initial beam cross-section. In this tube, aperture 131 was 0.005 inch in order to select only the desired 15 microamperes final beam current.

Focus aperture 133 is larger than aperture 131 by an amount selected to cancel the negative lens formed by the cathode-anode elements, so that the electrons enter the drift region moving substantially parallel to axis 112. In the drift region, the electrons travel under an accelerating voltage of about 5 volts and expand to the final diameter of 0.015 inch. Focus aperture 136 located at the downstream end of the 0.040-inch diameter drift cylinder permits final focusing of the electron beam. In the described tube, the surface of cathode 126 is approximately 0.125 inch from the pole face of core 128.

FIGURE 10 depicts the flux density variation in the tube from the pole piece in a direction along axis 112. The flux density at the cathode is 1400 gauss as compared with a flux density within solenoid 113 of 140 gauss. The field from solenoid 113 begins approximately 2 inches from the pole face. Hence, the ratio of flux density at the cathode to that at the input coupler is 10.

Curve 140 in FIGURE 11 depicts the change in cyclotron frequency in a direction downstream beginning from cathode 126. Curve 140 has a shape closely approximating that of a hyperbola. Curves 141 and 142 (associated with the right hand ordinate) depict the percentage change of the cyclotron frequency per radian of electron motion for drift velocities in the region defined by cylinder 134 and corresponding to 5 volts and 10 volts, respectvely. It will be noted that the magnetic distribution, and the corresponding change in cyclotron frequency, is smooth and that the rate of change of cyclotron frequency does not exceed 1.5 percent per radian.

FIGURE 12 depicts the fast-wave noise temperature as a function of the ratio of the flux density $B_1$ in the vicinity of the cathode to the flux density $B_2$ within solenoid 113. Curve 143 represents the theoretical noise temperature, while curve 144 is a plot of the measured beam temperature, corrected for coupler losses. It will be observed that a noise temperature lower than 130° is actually obtained with a flux strength ratio of 10 and that the noise temperature is still further reduced to a value of 68° K. with a strength ratio of 16. The latter temperature corresponds to a noise figure of 0.92 db. Consequently, with small input losses, which reasonably can be of the order of 0.25 db, terminal noise figures close to 1 db are possible with a 16:1 ratio of flux strengths.

FIGURE 13 depicts actual and theoretical noise temperatures as measured at the output coupler, thereby giving an indication of the effect of synchronous-wave noise converted to the fast cyclotron wave. Curve 45 is a plot of measurements with the actual structure mentioned above and depicts the noise temperature, corrected for coupler losses, as a function of quadrupole field potential which in turn is related to gain in the amplifier. It will be noted that the beam noise temperature is extremely small at zero gain and rises to perhaps 120° K. at 8 db gain. Curve 146 depicts the calculated noise temperature for this measurement. The two curves are quite similar.

Observing both FIGURES 12 and 13, it is apparent that in operating in accordance with the characteristics defined herein enables a substantial reduction in both the slow and fast wave noise temperatures. Since this is a function essentially entirely of the characteristics in the electron gun region, it is equally apparent that the invention is applicable to any kind of slow or fast wave amplifier, including conventional transverse field travelling wave tubes.

As mentioned with respect to FIGURE 11, the desired decrease in cyclotron frequency with increasing distance from the cathode follows a curve approximating a hyperbola. In analyzing the development of the flux distribution curve, it is useful to compute the fractional change of field $\Delta\omega_c/\omega_c$ per radian of orbital rotation. For convenience, this will be denoted by the symbol D. One radian of orbital rotation occurs over a distance $\Delta z$, where $$\Delta z=\frac{u_o}{\omega_c} \qquad (13)$$

and where $z$ represents distance along axis 112 in the Z direction and $u_o$ is the drift velocity of the electrons. $\Delta z$ is the distance over which the ratio $\Delta\omega_c/\omega_c$ is to remain below 0.015. Since $d\omega_c/dz$ is the change in cyclotron frequency per unit length, the change in cyclotron frequency $\Delta\omega_c$ over the length $\Delta z$ is expressed as follows:

$$\Delta\omega_c=\frac{d\omega_c}{dz}\cdot\frac{u_o}{\omega_c} \qquad (14)$$

and therefore:

$$D=\frac{\Delta\omega_c}{\omega_c}=\frac{d\omega_c}{dz}\cdot\frac{u_o}{\omega_c^2} \qquad (15)$$

A curve of $\omega_c$ as a fraction of $z$ which renders the right hand term of Equation 15 equal to a constant, which in accordance with the invention is less than 0.015, is a simple hyperbola for KE case that the drift velocity $u_o$ is constant.

In addition to the aforementioned fast and slow cyclotron waves which exist on the electron beam, there also are synchronous waves. Reduction of the axial magnetic field strength in too short a distance along the beam path can lead to active coupling between the cyclotron and synchronous waves, with resultant deleterious effects upon the noise temperature. This active coupling between an initial synchronous wave and the cyclotron wave is due to the radial component of the diverging axial magnetic field.

The quantity D is always negative for decreasing fields and is proportional to a vector which represents the incremental cyclotron wave generated at a point by active coupling to a given synchronous wave. The cumulative amount of noise power coupled from a synchronous wave to the cyclotron wave varies periodically through maximums and minimums as a function of distance along the beam path. Consequently, the electron velocity $u_0$ may be adjusted to make the null in this variation fall at the end of the changing-field region; this has the effect of rendering the change of field negligible upon the noise coupling properties. However, in practice it is difficult to achieve such an adjustment. Consequently, it is contemplated to utilize other than a simple hyperbolic change of field strength. For example, the field strength may change gradually at first in the direction away from the cathode, then follow a hyperbolic function, and finally again flare out gradually. This approach tends to render the noise power coupling negligible.

The above discussion and development of the quantity D leads to simple analysis with a hyperbolically decreasing field strength, since the quantity D is constant with distance and a curve of D as a function of $z$ is a straight line. Other field distributions may require considerably greater complexity in mathematical analysis. However, a principle to be followed in any case is the assigning of parameters so that the quantity D effectively has a value which is less than a specified maximum. A higher actual maximum value of D, or even a higher average D, may be permissible for the case of a gradual changing field than for a field which is hyperbolic throughout; but an effective value of D is defined as that which indicates an equivalent limitation upon the amount of undesirable noise coupling regardless of the distribution of the field. For this reason, it is appropriate to speak of the change in field in terms of its effective rate of change.

As a general statement about the quantity D under the assumption that the drift velocity $u_0$ is constant throughout the region of changing magnetic field: the area under a curve of D as a function of $z$ depends only on the initial and final values of $\omega_c$ and does not depend on the specific manner in which the field changes between these two terminal values. This is true because D is equal to the negative of the product of $u_0$ times the derivatives of the reciprocal cyclotron frequency with respect to distance, or:

$$D=-u_0\frac{d}{d_z}\left(\frac{1}{\omega_c}\right) \qquad (16)$$

Integrating over the decreasing field region, $$\int_{z1}^{z2} D dz=-u_0\frac{d}{dz}\left(\frac{1}{\omega_c}\right)\Big]_1^2=-u_0\left(\frac{1}{\omega_{c2}}-\frac{1}{\omega_{c1}}\right) \qquad (17)$$

Consequently, the average value of D is:

$$D_{av}=\frac{-u_0\left(\frac{1}{\omega_{c2}}-\frac{1}{\omega_{c1}}\right)}{z} \qquad (18)$$

Having selected the distribution of field desired, in order to minimize noise power coupling, for example, it remains necessary only to compute the distance $z$ over which the field is to decrease. Rearranging Equation 18, $$z=\frac{-u_0\left(\frac{1}{\omega_{c2}}-\frac{1}{\omega_{c1}}\right)}{Dav} \qquad (19)$$

Adjustment of the field distribution may be achieved by the use of any of a number of known field compensation techniques. Additional aiding or bucking windings may be included on core 128 or around the tube envelope. Small coils or permanent magnets may be placed about the circumference of the envelope to compensate for undesired variations or purposefully to cause variations in the field patterns created by magnet 124 and solenoid 113. Where practical, the entire magnetic field may be supplied by a permanent magnet structure shaped and magnetized to provide the desired field configuration.

In accordance with a further feature, described and claimed as such in the aforesaid application Ser. No. 326,737, the operating performance is improved by forming the pump section or expander so that the inhomogeneous field established across the beam path increases in intensity over at least the initial portion of the expander section. To this end, as illustrated in FIGURE 14, the electrodes of quadrupole 115′ are flared out at the upstream end 150 of the quadrupole section. Consequently, the transition into the quadrupole region is gradual and smooth, avoiding perturbations of the electron motion.

Optimization of performance is achieved by biasing the twisted quadrupole D.C. pump structure in a manner permitting the pump electrodes also to be used for centering of the beam. To this end, the pump electrodes are biased by connection across a primary potential source B+ and, in adidtion, each pair of like-polarized electrodes are further biased by an adjustable potential source ΔB+ connected in series between that pair and primary source B+. Adjustment of the potential of the ΔB+ sources permits the beam to be accurately centered within expander 115 so that maximum gain may be obtained without interception by the expander electrodes. A still further degree of adjustment flexibility may be achieved by providing individual external connections to each of the four quadrupole electrodes and utilizing individual adjustable potential sources, in combination with a primary source as in FIGURE 9 if desired, for each of the quadrupole electrodes.

Amplifiers built as embodied in FIGURE 9 are usable over a wide range of frequencies. Practical success is already indicated, for example, from 400 megacycles to L-band. In certain models, still further simplification is obtained by disposing the pole piece behind the cathode but inside the evacuated envelope in a manner that it forms an integral part of the tube structure. A permanent magnet is used behind the pole piece to provide a high intensity field at the cathode.

An interesting aspect of the invention is that in a given device the noise figure is predictable and can be made as low as desired by making the magnetic field at the cathode correspondingly high. Even at extremely high signal frequencies, the predictability remains. The embodiment of FIGURE 9 illustrates that even a tiny cathode emersed in a high magnetic field can generate a low-noise electron beam. That device is a practical low-noise UHF amplifier which achieves, without a radio-frequency pump, the low-noise performance normally expected of high-frequency parametric devices. The amplifier does not require near-perfect match at the input; yet, it retains all the properties of immunity to burn out, excellent phase linearity, perfect unilateral behavior and the stability which is characteristic of unilateral devices. It also is a single-channel amplifier.

The foregoing description has particularized as to structures for accomplishing cooling of the electron beam in a transverse-mode electron discharge device. It has shown the utilization of this concept in refrigerated terminating devices as well as its application to systems of amplification employing transverse-mode techniques. Both benefit materially from the reduced apparent noise temperature which the cooling technique makes possible.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An electron discharge device comprising:
a cathode for projecting an electron beam along a predetermined path;
means creating a magnetic field along a portion of and having flux lines generally parallel to said path;
a transverse-field electron coupler disposed along said path portion and effecting interaction between transverse electron waves on said stream and circuit waves on the coupler;
the structure of said cathode in the environment of said device tending to establish an initial operating temperature of said beam corresponding to a normal effective noise temperature of a predetermined value;
and means creating in the vicinity of said cathode a magnetic field of a strength substantially greater than that corersponding to said initial operating temperature and establishing an actual effective beam noise temperature of a value substantially lower than said predetermined value.

2. A device as defined in claim 1 in which the magnetic field is uniform throughout both said cathode vicinity and said path portion.

3. A device as defined in claim 2 in which the electron-resonant frequency established in said beam along said path portion in substantially higher than the frequency of said circuit waves.

4. A device as defined in claim 1 in which the magnetic field strength decreases non-uniformity from said cathode to said coupler.

5. A device as defined in claim 4 in which said non-uniform decrease is gradual.

6. A device as defined in claim 4 in which said strength decrease is substantially hyperbolic.

7. A device as defined in claim 4 in which said strength decreases at an effecitve rate not greater than approximately one and one-half percent per radian of electron orbital motion.

8. A device as defined in claim 7 in which the strength of said field in the immediate vicinity of said cathode is at least ten times the strength of the field in the vicinity of said coupler.

9. A device as defined in claim 4 in which a magnetic field concentrator is disposed immediately behind said cathode.

10. A device as defined in claim 9 in which said concentrator is a cone of magnetic material having its apex facing said cathode.

11. A device as defined in claim 10 in which said cone terminates in a pole piece of high-Curie-point ferromagnetic material.

12. A device as defined in claim 4 in which a permanent magnet is disposed behind said cathode.

13. A device as defined in claim 12 in which a magnetic field concentrator is disposed between said permanent magnet and said cathode.

14. A device as defined in claim 4 in which an electromagnet is disposed behind said cathode.

15. A device as defined in claim 14 in which said electromagnet is disposed immediately external to an end wall of said device and separated thereby from said cathode.

16. A device as defined in claim 15 in which said electromagnet includes a core tapering conically toward said path over its end portion adjacent to said end wall at an angle selected to develop flux lines in the vicinity of and beyond said cathode which define a rate of change of field strength not greater than approximately one and one-half percent per radian of electron orbital motion.

17. A device as defined in claim 4 in which disposed along said path beyond said electron coupler are means for amplifying electron-wave energy imparted to said beam by said coupler.

18. A device as defined by claim 17 in which said amplifying means subjects said electrons to a periodically varying inhomogeneous field the periodicity of which is so related to the electron resonant condition of said beam as to enable the delivery of energy to a component of the electron motion in proportion to the energy in said component.

19. A device as defined in claim 18 in which said inhomogeneous field is spatially static.

20. A device as defined in claim 4 in which said electron coupler propagates said circuit waves in approximate synchronism with said electrons, enabling cumulative interaction of said electron and circuit waves with resulting amplification of the latter.

21. A device as defined in claim 4 in which said circuit waves have a frequency higher than the electron resonant frequency established in said beam along said path portion.

22. A device as defined in claim 4 in which said circuit waves have a frequency approximately the same as the electron resonant frequency established in said beam along said path portion.

23. A device as defined in claim 4 in which said circuit waves have a frequency lower than the electron-resonant frequency established in said beam along said path portion.

24. A device as defined in claim 4 in which components disposed between said cathode and said coupler comprise:
an accelerating electrode adjacent to said cathode and having an aperture centered on said path;
a focusing electrode adjacent to the downstream side of said accelerating electrode and having an aperture centered on said path;
and means defining a drift region downstream from said focusing electrode.

25. A device as defined in claim 24 including a second focusing electrode at the downstream end of said drift region.

26. A device as defined in claim 24 in which said drift-region-defining means comprises an elongated tube coaxial with said path.

27. A device as defined in claim 24 wherein said aperture in said accelerating electrode has a cross-sectional area substantially smaller than the cross-sectional area of the electron stream emitted from said cathode, and said focusing electrode aperture has a cross-sectional area sufficiently larger to nullify the convergent lens formed by said cathode and said accelerating electrode.

28. A device as defined in claim 1 in combination in a system comprising:
a second cathode for projecting a second electron beam along a second path;
means for establishing a condition of electron resonance for electrons in said second beam;
a second electron coupler disposed along said second path portion and effecting interaction between electron waves on said second beam and circuit waves on said second coupler; and
means electrically coupling said second coupler with said transverse-field coupler and constituting the latter as a noise sink for the former.

29. A device as defined in claim 28 in which said second cathode and said second coupler are components of an electron beam parametric amplifier.

30. A device as defined in claim 29 in which said second coupler is a signal input coupler of said parametric amplifier.

31. A device as defined in claim 30 in which said second coupler is electrically coupled to an input signal source by a first band-pass filter selective of signals at the input signal frequency and further is also electrically coupled to said transverse-field coupler by a second band-pass filter selective of signals at the idler frequency of said amplifier.

32. A device as defined in claim 29 in which said parametric amplifier includes an input coupler electrically coupled to a signal source by a band-pass filter selective of signals at the input signal frequency and in which said second coupler is disposed upstream of said input coupler.

No references cited.

ROY LAKE, *Primary Examiner.*

D. R. HOSTETTER, *Assistant Examiner.*